(12) United States Patent
Kupkova

(10) Patent No.: US 7,162,501 B2
(45) Date of Patent: Jan. 9, 2007

(54) HIERARCHICAL DIFFERENTIAL DOCUMENT REPRESENTATIVE OF CHANGES BETWEEN VERSIONS OF HIERARCHICAL DOCUMENT

(75) Inventor: Helena Kupkova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/306,539

(22) Filed: Nov. 26, 2002

(65) Prior Publication Data

US 2004/0103124 A1    May 27, 2004

(51) Int. Cl.
G06F 17/30    (2006.01)
G06F 7/00    (2006.01)

(52) U.S. Cl. .................. 707/203; 707/101; 707/102

(58) Field of Classification Search ............ 707/203, 707/8, 205, 101, 102
See application file for complete search history.

(56) References Cited

U.S. PATENT DOCUMENTS 6,212,534 B1 * 4/2001 Lo et al. ............... 715/511
6,247,066 B1 * 6/2001 Tanaka ................. 719/320
6,519,557 B1 * 2/2003 Emens et al. ............ 704/8
6,560,620 B1 * 5/2003 Ching .................. 715/511
6,718,329 B1 * 4/2004 Selvin et al. ............ 707/10
2002/0095444 A1 * 7/2002 Mantaro ............... 707/515
2003/0135520 A1 * 7/2003 Mitchell et al. ........ 707/200
2004/0025117 A1 * 2/2004 Ingersoll et al. ........ 715/523

* cited by examiner

Primary Examiner—John Cottingham
Assistant Examiner—Kuen S. Lu
(74) Attorney, Agent, or Firm—Woodcock Washburn LLP

(57) ABSTRACT

A hierarchical differential document is produced to report changes between a first and a second version of a hierarchical document. The first and second versions are received and examined, and the changes therebetween are noted. Such changes are definable as a plurality of operations. At least two of the operations are identified as being related as constituent operations of an extended operation, and the differential document is constructed to report the changes. In the differential document, for each identified extended operation, each constituent operation of the identified extended operation is associated as being part of such identified extended operation.

24 Claims, 3 Drawing Sheets

HIERARCHICAL DIFFERENTIAL DOCUMENT REPRESENTATIVE OF CHANGES BETWEEN VERSIONS OF HIERARCHICAL DOCUMENT

TECHNICAL FIELD

The present invention relates to a hierarchical document that expresses changes made as between first and second versions of a hierarchical document. More particularly, the present invention relates to creating such a hierarchical differential document, whereby same may be applied to the first version of the hierarchical document to result in the second version of the hierarchical document.

BACKGROUND OF THE INVENTION

As may be appreciated, it is oftentimes beneficial to be able to compare different versions or copies of a document in a manner such that a differential document is produced to detail changes between the versions or copies. It is especially beneficial to be able to do so in an automated electronic manner when the document versions or copies are in electronic form. With such a differential document, for example, one may be able to discern slight changes between versions of a document that would otherwise go unnoticed. Similarly, one can determine whether two copies of a document are identical, or whether one of the copies has been changed. In either case, such changes can be set forth clearly within the differential document.

Note, too that with such a differential document setting forth the changes between a first version and a second version of a document, the second version of the document may be produced by properly applying the changes in the differential document to the first version of the document. Accordingly, if a recipient of a first version of a document is to also receive a second, updated version of the document, such recipient may instead be provided with a corresponding differential document with instructions to produce the second version of the document by applying the changes in the differential document to the first version of the document. Especially in the case where the documents are relatively large and the changes as embodied in the corresponding differential document are relatively small, providing the differential document rather than the second version of the document is clearly more desirable, especially if delivery is effectuated electronically.

Thus, the differential document may be employed as a source control or delta-encoding file in connection with, for example, an array of servers caching a document. Changes to the document on one server can be sent over a network to the other servers, and rather than creating unnecessary network load by trying to ship the entire document between servers, each server can receive a differential document embodying the changes.

The present invention provides a tool for comparing first and second documents and noting the changes therebetween. Specifically, the present invention provides a tool for comparing two hierarchical documents such as XML (eXtensible Markup Language) documents and noting the changes therebetween in a hierarchical differential document such as an XML differential document. The invention employs a hierarchically based differential language to describe the changes between the documents, where the language is able to represent the addition, change, or removal of hierarchical nodes and fragments, as well as more complex changes like a move of a hierarchical fragment. The hierarchical differential document thus represents the changes as a structured tree of operations that can be applied to the first hierarchical document to produce the second (changed) hierarchical document.

SUMMARY OF THE INVENTION

In the present invention a hierarchical differential document is produced to report changes between a first and a second version of a hierarchical document. In particular, the first and second versions are received upon an identification of same, and any selection of options is also received. Thereafter, the first and second versions are examined and the changes therebetween are noted. Such changes are definable as a plurality of operations. At least two of the operations are identified as being related as constituent operations of an extended operation, and the hierarchical differential document is constructed to report the changes. In the hierarchical differential document, for each identified extended operation, each constituent operation of the identified extended operation is associated as being part of such identified extended operation.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
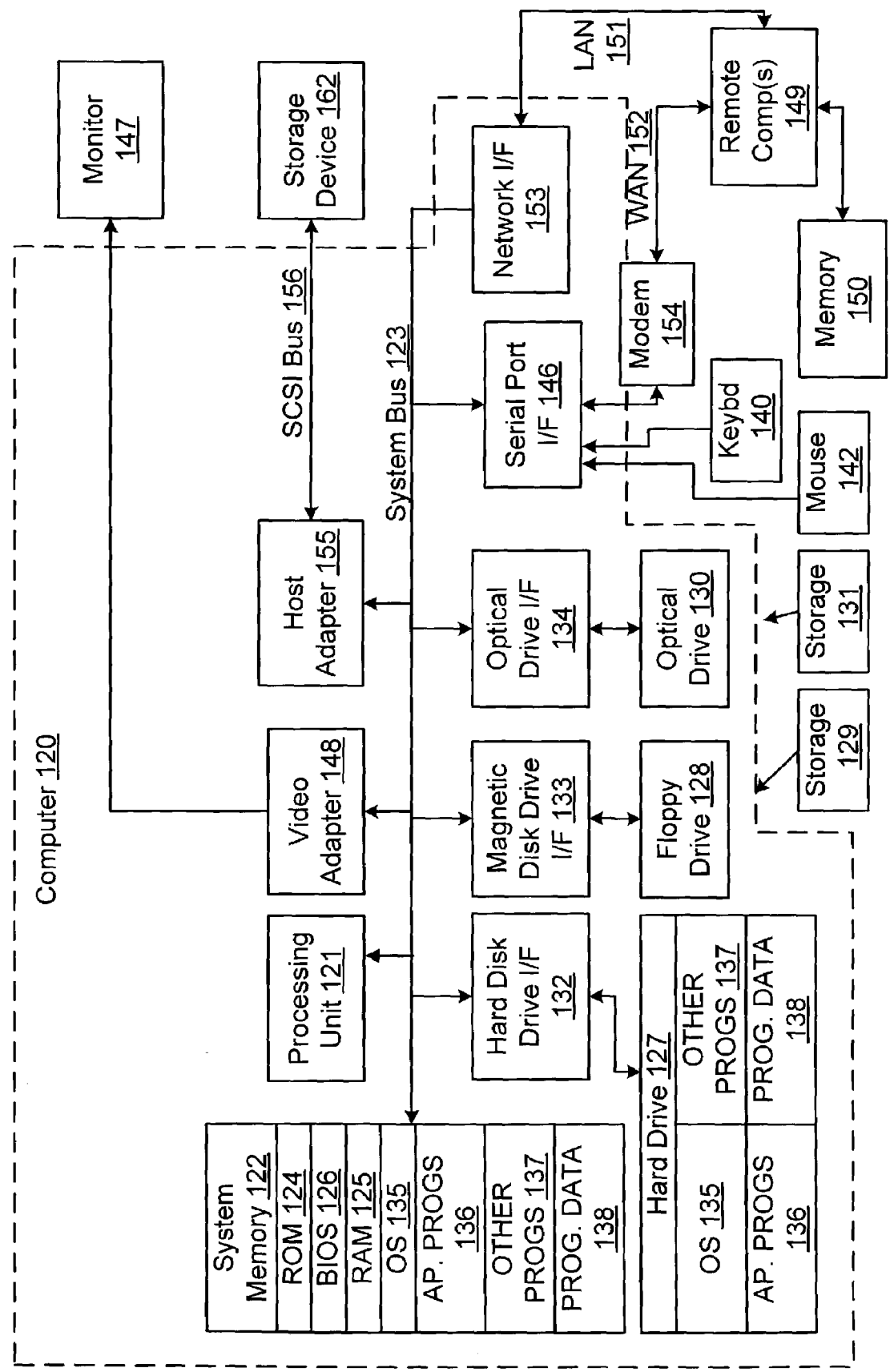
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including-the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Hierarchical Differential Document and Language

Figure 2:
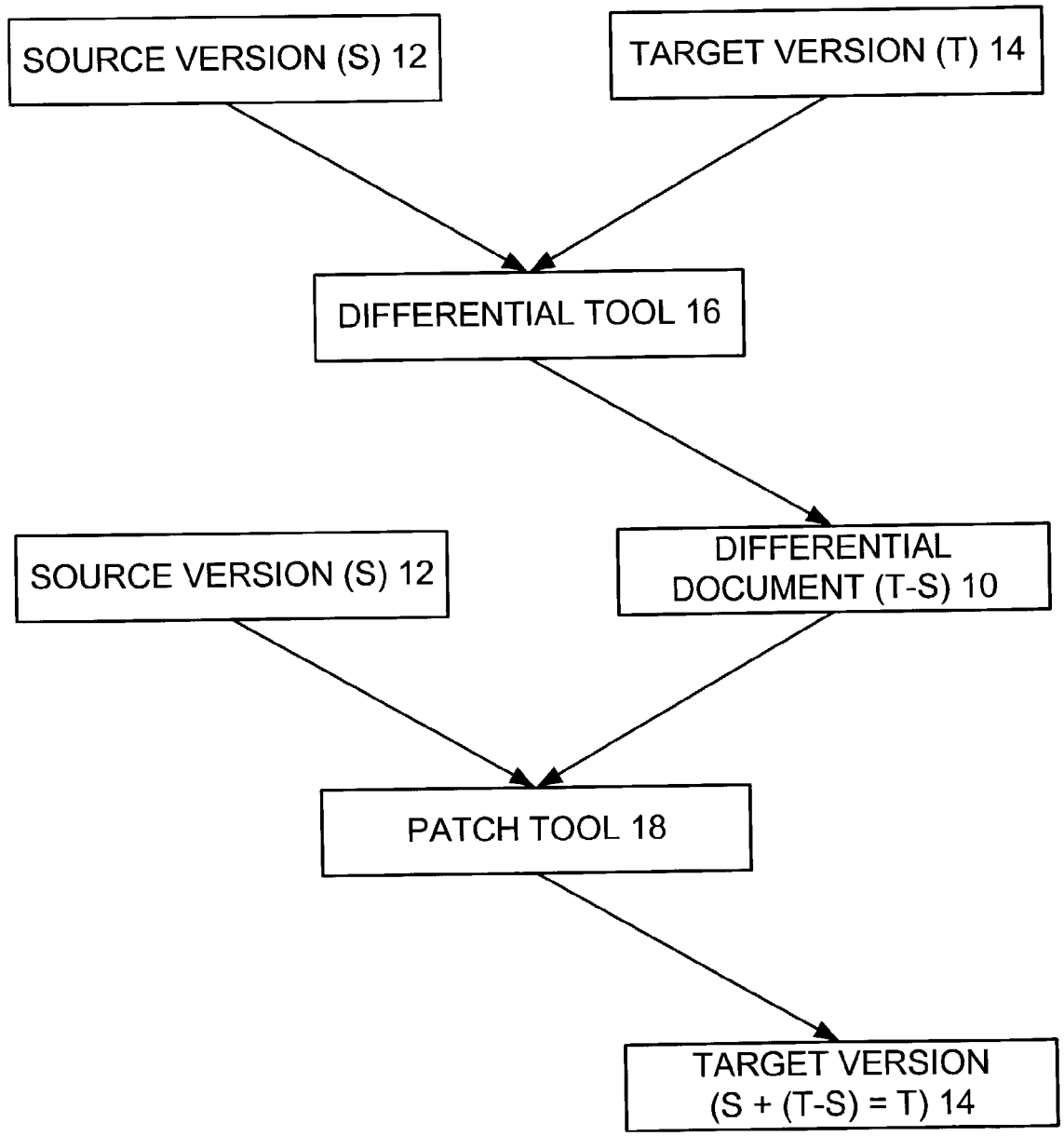
FIG. 2 is a block diagram showing a differential tool producing a differential document based on a source (i.e., first) and a target (i.e., second) version of a document, and a patch tool producing the target version based on the source version and the differential document.

In one embodiment of the present invention, and turning now to FIG. 2, to produce a hierarchical differential document 10 based on changes between first and second versions of a hierarchical document 12, 14, the first and second versions 12, 14 are applied to a hierarchical differential tool 16 to produce the hierarchical differential document 10. Operation of such tool 16 should be apparent to the relevant public based on the present disclosure and therefore need not be described herein in any detail. Any appropriate tool 16 may therefore be employed without departing from the spirit and scope of the present invention.

Correspondingly, to produce the second version 14 based on the first version 12 and the differential document 10, such first version 12 and differential document 10 are applied to a patch tool 18 to produce the second version 14. As with the differential tool 16, operation of the patch tool 18 should be apparent to the relevant public based on the present disclosure and therefore need not be described herein in any detail. Any appropriate patch tool 16 may therefore be employed without departing from the spirit and scope of the present invention.

Note that the tools 16, 18 in addition to hierarchical documents may also operate on hierarchical fragments, nodes, objects, or the like. Accordingly, use of the term 'hierarchical document' or the like herein shall be intended to include such other types of hierarchical items unless circumstances dictate otherwise.

Essentially, both the differential tool 16 and patch tool 18 employ a pre-defined differential class that is used to compare the two versions of the hierarchical document 12, 14, detect additions, deletions and other changes between the versions 12, 14, and produces the differential document 10 that describes the differences between the two hierarchical documents. Once again, the details of the differential class should be apparent to the relevant public based on the present disclosure and therefore need not be described herein in any detail. Any appropriate differential class may therefore be employed without departing from the spirit and scope of the present invention. Note that as an alternative to the differential class being employed by both the differential tool 16 and the patch tool 18, the patch tool may employ a separate but related patch class.

In one embodiment of the present invention, the differential class detects additions, deletions, and other changes between the two versions 12, 14 and reports same. The differential class also detects structural changes such as for example when a hierarchical sub-tree is moved within a document. Note that the differential class may contain functionality to ignore certain non-substantive differences such as comments or processing instructions. In one embodiment of the present invention, the differential class produces the differential document 10 in a format that facilitates displaying the changes as between the versions 12, 14 of the document.

The differential class performs a hierarchically-based comparison of the versions 12, 14 of the document, as opposed to a common lexical comparison. Thus, and for example in versions of an XML-type document, the class ignores order of attributes, insignificant white spaces, does not distinguish between an empty element <a/> and an element with no content <a></a>, and is not affected by document encoding. The class may also be directed to ignore comments, processing instructions, XML-type declarations, prefixes, namespaces, child-order, and the like. Alternatively, the class may be hard-coded to ignore some or all of the aforementioned items.

The class may employ any appropriate algorithm to compare the versions 12, 14 of the document without departing from the spirit and scope of the present invention. Details of such algorithms are known or should be apparent to the relevant public, and therefore need not be set forth herein in any detail. For example, the algorithm may be a precise one that finds editing distance between trees, such as the Zhang-Shasha algorithm. Correspondingly, the algorithm may be a simpler one that traverses the tree and compares each node. Notably, any algorithm should be accurate.

Following are examples of versions 12, 14 of a document and the hierarchical differential document 10 resulting therefrom. Also following are illustrations of the syntax of the differential language employed to construct the differential document 10. The differential language in one embodiment of the present invention is an XML-based language.

As constructed by the differential class, the differential document 10 may have a root element that contains the version of the document 10, a namespace, a fragment attribute indicating whether whole documents or just fragments were compared, and any options selected when the document 10 was created. The root element may also contain a hash value calculated from the source (i.e., first) version 12 of the document being compared. As may be appreciated, the hash value is employed to identify the source version 12, so that the patch tool 18 can be satisfied that the created differential document 10 is applied to the correct source document 12 when producing the target (i.e., second) version 14 of the document. The descendent nodes of the root element describe the particular differences between the source and target versions 12, 14 of the document under consideration.

EXAMPLE A

```
Source version 12:
<b>
    <a>Some text 1</a>
    <b>Some text 2</b>
    <c>Some text 3</c>
    <z> Another text
        <fob/>
    </z>
</b>
Target version 14:
<b>
    <yy>Some text 1</yy>
    <b>Some text 2</b>
    <c>Some text 3</c>
    <d>Some text 4</d>
    <z>Changed text</z>
</b>
Differential document 10:
<xd:xmldiff version="1.0" srcDocHash="3700808836200110572"
options="None" fragments="no"
xmlns:xd="http://schemas.microsoft.com/xmltools/2002/xmldiff ">
    <xd:node match="1">
        <xd:change match="1" name="yy" />
        <xd:node match="3"/>
        <xd:add>
            <d>Some text 4</d>
        </xd:add>
        <xd:node match="4" >
            <xd:change match="1" >Changed text</xd:change>
            <xd:remove match="2" />
        </xd:node>
    </xd:node>
</xd:xmldiff>
```

As can be seen from Example A, in the differential language employed, any particular modification to a node in the source version 12 as compared to the target version 14 is signified by a CHANGE, ADD, or REMOVE operator in the differential document 10, a description of the modified node in the source version 12 by way of a path descriptor ('match="1"', e.g.), and the modification itself. All path descriptors refer to the tree of the source version 12 before any changes are applied. Examples of path descriptors and explanations thereof are as follows:

| | |
|---|---|
| 3 | the third child node of the current node. |
| 1–2 | the first and second child of the current node. |
| 1–2\|5 | the first, second, and fifth child of the current node. |
| /1/2 | the second child of the first node at the root level. |
| /1/2/3–6 | the third, fourth, fifth, and sixth child of the second child of the first node at root level. |
| @value | the attribute named 'value'. |
| @value \| @type | the attribute named 'value' and the attribute named 'type'. |

The differential language employs a NODE operator in a differential document 10 to describe changes on the child nodes of a node in the source version 12, or to describe the position after which a new sibling node is to be added. In particular, the NODE element contains the match attribute with a path descriptor identifying the referenced node. Examples of such a NODE element are as follows:

<xd:node match="3"/>—from Example A, identifies the third node of the current source element. The addition of sibling nodes after the third node may follow:

```
<xd:add>
    <d>Some text 4</d>
</xd:add>
```

<xd:node match="4">—from Example A, identifies the fourth node of the current source element. The changes on the child nodes of the fourth node are described in the child nodes of the fourth node follow:

```
<xd:change match="1" >Changed text</xd:change>
<xd:remove match="2" />
</xd:node>
```

As seen in the differential document 10 of Example A, the operator names such as ADD, REMOVE, CHANGE, and NODE are qualified with the xd: prefix which as set forth in the root node is associated with the namespace http://schemas.microsoft.com/xmltools/2002/xmldiff.

An ADD element such as that from Example A:

```
<xd:add>
    <d>Some text 4</d>
</xd:add>
``` is employed in the differential document 10 when a new node or fragment is found in the target version 14 that was not found in the source version 12. Here, the ADD element adds one element and one text node. In such a situation, when adding a fragment or multiple nodes, there are no additional attributes on the ADD element, except perhaps an opid attribute which is set forth in more detail below. The new fragment is specified as the content of the ADD element between the <xd:add> and </xd:add> tags. The xd:add element that has no attributes may also be employed to add a single nodes such as text node, a CDATA section, processing instruction, or comment.

In another example of an ADD element, a single node with a single child node is added:

```
<xd:add type="1" name="Customer">
    <xd:add type="2" name="id">1001</xd:add>
</xd:add>
```

As seen, the ADD element has the attribute 'type' that indicates what type of node was added, for example using a standard such as the W3C Node Types enumeration. Thus, in the preceding example, a new Customer element is added with an attribute (i.e., type 2 child node) named 'id' with a value '1001'. The ADD element can have a 'name' attribute, which is the local name for the new element or attribute, or the name for DTD or entity reference. The element can also contain an ns attribute, indicating the namespace, and a prefix attribute indicating the prefix for the new element or attribute name. The element can also have an opid attribute which as set forth in more detail below contains an ID number attached to a group of operations including the current ADD operation. If the new node type is a DTD, the ADD element may contain attributes 'systemId' and 'publicId' specifying the system and public identifiers for the DTD.

A REMOVE element such as that from Example A:

<xd:remove match="2"/> is employed in the differential document 10 to report when a node or fragment has been removed from its location in the tree of the source version 12, and may or may not appear in another location in the tree of the target version 14. In this instance, the REMOVE element reports that the second child of the current element has been removed.

As should be appreciated, then, the REMOVE element includes an attribute with a relative path descriptor that evaluates to a list of nodes or a list of attributes that have been removed. In addition, the element may include a sub-tree attribute describing whether the descendants of the nodes (i.e., the sub-trees) have been removed as well. The element can also have an opid attribute which as set forth in more detail below contains an ID number attached to a group of operations including the current REMOVE operation.

In one embodiment of the present invention, the differential tool 16 can discern when a node or fragment in the source version 12 has moved to a new position in the tree of the target version 14. The differential tool 16 reports same in the differential document 10 as a pair of an ADD operation and a REMOVE operation. As should be appreciated, the REMOVE operation is reported as shown where the node or fragment has been moved from and the ADD operation is reported where the node or fragment has been moved to. In this case, the ADD element may simply specify a path descriptor for the node in the source version 12 that is to be moved. Such ADD element can also include a sub-tree attribute describing whether the descendants of the described node (i.e., the sub-tree) is to be moved as well. For example, the following ADD element reports that the fifth and sixth child nodes of the first node at the root level were moved to the current position in the tree of the source version 12:

<xd:add match="/1/5–6"/>.

Once again, the ADD element can also have an opid attribute which as set forth in more detail below contains an ID number attached to a group of operations including the current ADD operation.

A CHANGE element such as that from Example A:

<xd:change match="1" name="yy"/> is employed to report when a name and/or value of a node in the source version 12 has changed as compared to the target version 14 of the document has had its name or value modified, or both. Here, the name of the first child node of the current node has changed to "yy".

The CHANGE element includes as an attribute a path descriptor evaluating to a single child node or a single attribute of the current parent element, a changed local name for the element or attribute, or changed target name for the processing instruction, a changed namespace URI for the element or attribute, a changed prefix for the element or attribute, a changed name, system and/or public identifier for the changed DTD node. Once again, the ADD element can also have an opid attribute which as set forth in more detail below contains an ID number attached to a group of operations including the current CHANGE operation.

In one embodiment of the present invention, the differential tool 16 groups together a number of differential operations as reported in the differential document and reports the grouping in same as an extended operation. Each extended operation has an ID number, and each related differential operation, including related ADDs, REMOVEs, and CHANGEs, carries this ID number as the opid attribute disclosed above. The extended operation may also have a descriptor that further describes same.

For example, moving a node/fragment from one part of the tree of the source version 12 to another is accomplished by a REMOVE operation and a corresponding ADD operation, as was disclosed above, and such a move is considered an extended operation. Both operations are reported in the differential document 10 at the places in the tree where the nodes have been removed and added. Significantly, the opid attributes of both operations have the same ID number, thus connecting the operations together with the extended operation descriptor and indicating that the REMOVE and ADD operations are in fact paired to form a move operation.

In one embodiment of the present invention, the descriptor of an extended operation appears in the differential document 10 as a DESCRIPTOR element. Such element has the ID number as an opid attribute, and a type as type attribute. Types of extended operations include 'move', 'namespace change', and 'prefix change'.

An example of a move operation descriptor is:

```
<xd:descriptor type="move" opid="2"/>
``` and shows that all operations with an opid attribute with the value 2 form the move operation.

A namespace change operation descriptor identifies a change of namespace declaration. The extended operation itself includes an ADD operation to report the addition of the new namespace declaration, and a REMOVE operation to report the removal of the old namespace declaration. Additionally, the namespace change extended operation may contain any number of CHANGE operations with the opid attribute of the descriptor for every element or attribute name that has its namespace URI changed as a result of the namespace change.

An example of a namespace change, with source version 12, target version 14, and differential document 10, in that order, is:

```
<a:book xmlns:a="http://my.company.com/">
    <a:title>2001: Space Odyssey</a:title>
    <a:author>Arthur C.Clark</a:author>
    <a:isbn>123456789</a:isbn>
</a:book>
<a:book xmlns:a="http://other.company.com/">
    <a:title>2001: Space Odyssey</a:title>
    <a:author>Arthur C.Clark</a:author>
    <a:isbn>123456789</a:isbn>
</a:book>
<?xml version="1.0" encoding="utf-16" ?>
<xd:xmldiff version="1.0" srcDocHash="10087929050242373683"
  options="None" fragments="no"
  xmlns:xd="http://schemas.microsoft.com/xmltools/2002/xmldiff">
    <xd:change match="1" opid="1" ns="
    http://other.company.com/">
        <xd:add type="2" prefix="xmlns" name="a"
        opid="1">http://other.company.com/</xd:add>
        <xd:remove match="@xmlns:a" opid="1" />
        <xd:change match="1" opid="1" ns="
        http://other.company.com/"
        />
        <xd:change match="2" opid="1" ns="
        http://other.company.com/"
        />
        <xd:change match="3" opid="1" ns="
        http://other.company.com/"
        />
    </xd:change>
    <xd:descriptor opid="1" type="namespace change" prefix="a"
      oldNs="http://my.company.com/" newNs="http://other.company.com/" />
</xd:xmldiff>
```

Here, the differential document 10 and the DESCRIPTOR element therein show that a namespace change has occurred from the old namespace "http://my.company.com/" to the new namespace "http://other.company.com/". All operations with an opid attribute with the value 1 form the namespace change operation.

A prefix change operation descriptor identifies a change of prefix. The extended operation includes an ADD operation to report the addition of the new prefix, and a REMOVE operation to report the removal of the old prefix. Additionally, the prefix change extended operation may contain any number of CHANGE operations with the opid attribute of the descriptor for every element or attribute name that has its prefix changed as a result of the prefix change.

An example of a prefix change, with source version 12, target version 14, and differential document 10, in that order, is:

```
<a:book xmlns:a="http://my.company.com/">
    <a:title>2001: Space Odyssey</a:title>
    <a:author>Arthur C.Clark</a:author>
    <a:isbn>123456789</a:isbn>
</a:book>
<b:book xmlns:b="http://my.company.com/">
    <b:title>2001: Space Odyssey</b:title>
    <b:author>Arthur C.Clark</b:author>
    <b:isbn>123456789</b:isbn>
</b:book>
<?xml version="1.0" encoding="utf-16" ?>
<xd:xmldiff version="1.0" srcDocHash="10087929050242373683"
    options="None" fragments="no"
    xmlns:xd="http://schemas.microsoft.com/xmltools/2002/xmldiff">
    <xd:change match="1" opid="1" prefix="b">
        <xd:add type="2" prefix="xmlns" name="b"
            opid="1">http://my.company.com/</xd:add>
        <xd:remove match="@xmlns:a" opid="1" />
        <xd:change match="1" opid="1" prefix="b" />
        <xd:change match="2" opid="1" prefix="b" />
        <xd:change match="3" opid="1" prefix="b" />
    </xd:change>
    <xd:descriptor opid="1" type="prefix change"
        ns="http://my.company.com/" oldPrefix="a" newPrefix="b" />
</xd:xmldiff>
```

Here, the differential document 10 and the DESCRIPTOR element therein show that a prefix change has occurred from the old prefix "a" to the new prefix "b". All operations with an opid attribute with value 1 form the prefix change operation.

Note that a DESCRIPTOR element is not strictly necessary for operation of the patch tool 18 in applying the differential document 10 to the first version 12 to result in the second version 14. That is, the patch tool 18 could still function inasmuch as the constituent operations of an extended operation can function independently of the extended operation. However, the DESCRIPTOR element is useful in identifying by way of the OPID attribute the constituent operations that combine to form an extended operation, and in identifying by way of the type attribute the type of extended operation. Such information is for example useful in the situation where a display of the differential document 10 is created, and it is desired to set off each extended operation, for example by highlighting each extended operation type with a different color, typeface, type size, or the like, or by visually connecting the constituent operations.

Such information is also useful in the situation where a user is given the option of rejecting or accepting each change in the first version 12 as set forth within the differential document 10. In particular, if a user rejects an extended operation as represented by a DESCRIPTOR element, such DESCRIPTOR element conveniently allows for the removal of all corresponding elements having the same opid attribute from the differential document 10. Thus, such modified differential document 10 as applied to the patch tool 18 will not effectuate the rejected change in producing the second version 14 of the document. Similarly, if a user accepts an extended operation, all constituent operations will be accepted and the user will not have to accept them individually.

Figure 3:
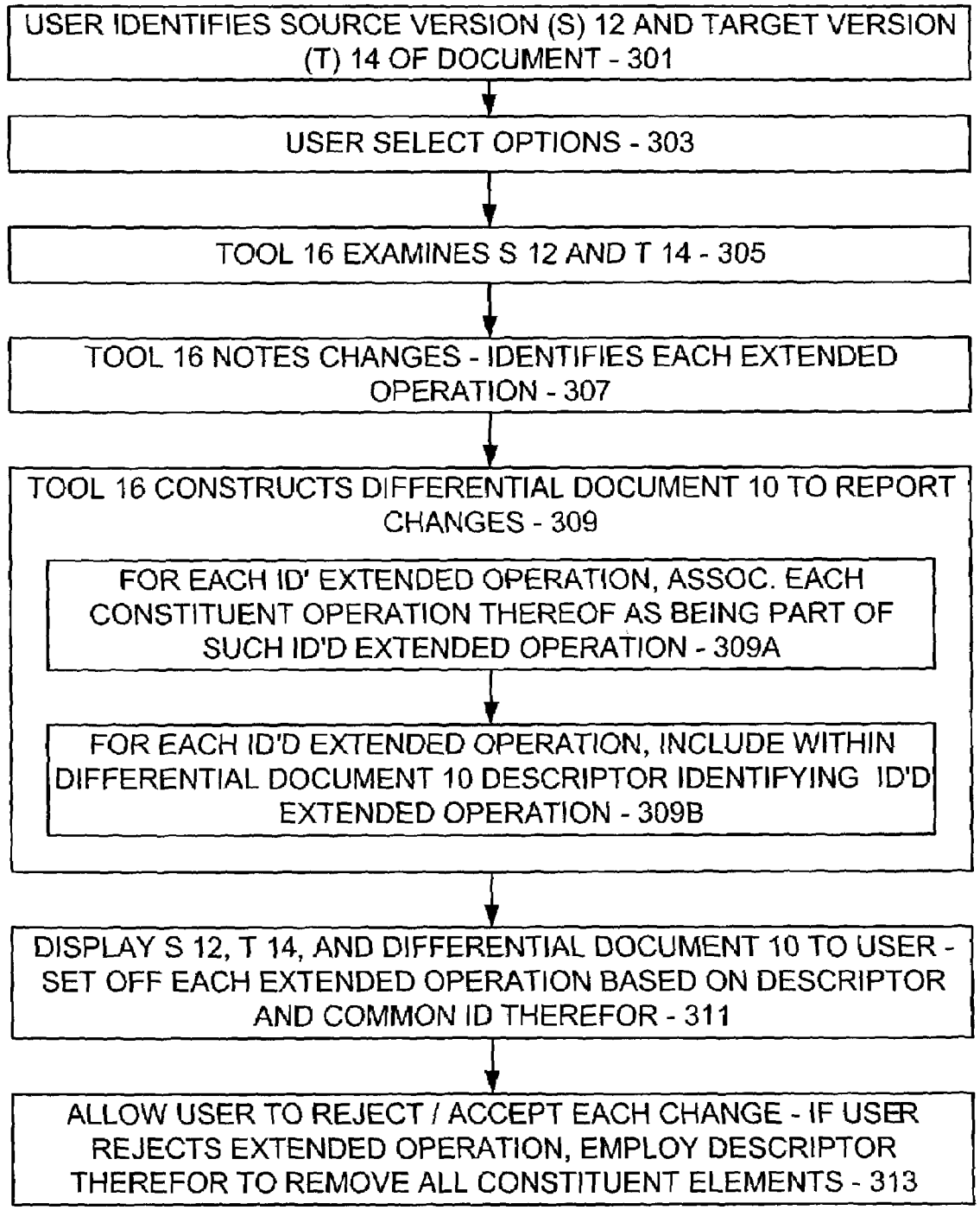
FIG. 3 is a flow diagram showing steps performed in connection with the source and target versions of the document, the differential tool, and the differential document, in accordance with one embodiment of the present invention.

Turning now to FIG. 3, the differential tool 16 operates in the following manner. Preliminarily, a user instantiates the tool 16, and then identifies to the tool 16 a source version (S) 12 and a target version (T) 14 of a document to be examined for changed thereto (step 301). The user may also select any options (step 303) such as for example to ignore comments or white spaces, as was set forth above. The tool 16 then examines S 12 and T 14 (step 305), notes the changes therebetween (step 307) and constructs the differential document 10 to report the changes in a form amenable to the patch tool 18 (step 309).

Notably, the tool 16 in noting the changes as at step 307 identifies each extended operation, and in constructing the differential document 10 as at step 309 for each identified extended operation associates each constituent operation of the identified extended operation as being part of such identified extended operation (step 309*a*). As set forth above, the association occurs by tagging the element of each constituent operation with a common ID such as an opid attribute. In addition, the tool 16 for each identified extended operation includes within the differential document 10 a descriptor identifying the extended operation (step 309*b*). Such descriptor in particular identifies a type for the extended operation, such as 'move', 'namespace change', or 'prefix change', and includes the opid attribute as the common ID.

The differential tool 16 or another tool may then display S 12, T 14, and the differential document 10 to the user (step 311). In doing so, the tool 16 or other tool may set off each extended operation based on the descriptor and/or common ID therefor by for example highlighting each extended operation type with a different color, typeface, type size, or the like. The differential tool 16 or another tool may also allow the user to reject or accept each change to S 12 as set forth within the differential document 10 (step 313). In particular, if a user rejects an extended operation as represented by a DESCRIPTOR element, the tool 16 or another tool employs such DESCRIPTOR element to remove all constituent elements of the extended operation.

EXAMPLE B

The following example is based on a source version 12, below left, and a target version 14, below right with spacing added to show approximate alignment between lines, and the differential document 10 generated therefrom by the differential tool 16, below:

```
<?xml version="1.0"?>              <?xml version="1.0"?>
<b>                                <b>
  <a>Some text 1</a>                 <yy>Some text 1</yy>
  <b>Some text 2</b>                 <b>Some text 2</b>
  <c>Some text 3</c>                 <c>Some text 3</c>
                                     <e>Some text 4</e>
                                     <f>Some text 5</f>
  <d>                                <d>Changed text</d>
    Another text
    <fob/>
  </d>
  <x firstAttr="value1"              <x firstAttr="changed attribute
                                        value"
    secondAttr="value2"/>             newAttr="new value"/>
                                     <p>
                                       <q>
<y>                                  <y>
<!--Any comments?-->                 <!--Any comments?-->
<z id="10">Just another text</z>     <z id="10">Just another
                                        text</z>
</y>                                 </y>
                                     </q>
                                     </p>
</b>                                 </b>
 1  <?xml version="1.0" encoding="utf-16"?>
 2  <xd:xmldiff version="1.0" srcDocHash="53469985444451918424"
       options="None" fragments="no"
       xmlns:xd="http://schemas.microsoft.com/xmltools/2002/xmldiff">
 3    <xd:node match="2">
 4      <xd:change match="1" name="yy" />
 5      <xd:node match="3" />
 6      <xd:add>
 7        <e>Some text 4</e>
 8        <f>Some text 5</f>
 9      </xd:add>
10      <xd:node match="4">
11        <xd:change match="1">Changed text</xd:change>
12        <xd:remove match="2" />
13      </xd:node>
14      <xd:node match="5">
15        <xd:remove match="@secondAttr" />
16        <xd:add type="2" name="newAttr">new value</xd:add>
17        <xd:change match="@firstAttr">changed attribute
            value</xd:change>
18      </xd:node>
19      <xd:remove match="6" opid="1" />
20      <xd:add type="1" name="p">
21        <xd:add type="1" name="q">
22          <xd:add match="/2/6" opid="1" />
23        </xd:add>
24      </xd:add>
25    </xd:node>
26    <xd:descriptor opid="1" type="move" />
27  </xd:xmldiff>
```

Comments on the differential document 10 of Example B:

Line 1: is required to create a well-formed XML document.

Line 2: is the root element and contains the version, the namespace declaration for the xd: prefix, the options selected when the differential document 10 was created, and the hash 'srcDocHash' with a hash value calculated from the source version 12, and the fragment attribute indicating that whole documents were compared.

Line 3: is a NODE element with a match attribute containing a path descriptor pointing to the second element at the source tree root level, which is the <b> element, and indicates that there will be some changes described on either the child nodes of the <b> element, or on the sibling nodes following the <b> element, or both. In this particular case, the child nodes of the NODE element describe the changes on the child nodes of the <b> element.

Line 4: is a CHANGE element with path descriptor "1" which points to <a>, the first child node of the <b> element. The name attribute 'yy' is the new local name for the pointed-to node.

Line 5: is a NODE element with a match attribute containing a path descriptor pointing to the third child node of the <b> element, which is the <c> element. In this case, the NODE element has no child nodes and it is indicating that there will be some change such as an add of a sibling node following the <c> element.

Line 6: is an ADD element, as was hinted to by the previous NODE element. The ADD element adds after the <c> bode as siblings thereto the child nodes of such ADD element. Note that there are no attributes associated with the ADD element.

Lines 7–8: are the sibling nodes <e> and <f> added after the <c> element.

Line 9: is an end element ending the ADD operation.

Line 10: is a NODE element with a path descriptor pointing to the fourth child node. Since the NODE element is nested under the NODE element of line 3, which points to the <b> element, the present NODE element points to the fourth child node under the <b> element, which is the <d> element. The present NODE element has child nodes, thus indicating that change will be described with respect to child nodes of the <d> element.

Line 11: is a CHANGE element with a path descriptor "1" that points to the first child node of the <d> element, which is a text node, 'Another text'. The CHANGE element changes such text node to be 'Changed text'.

Line 12: is a REMOVE element with a path descriptor "2" that points to the second child node of the <d> element, which is the <fob/> element. The REMOVE element thus deletes such <fob/> element from the present location within the tree of the source version 12.

Line 13: is an end element ending the NODE operation. The next operation is thus nested under the <b> element again.

Line 14: is a NODE element with a path descriptor pointing to the fifth child node of the <b> element, which is the <x> element. The child nodes of the present NODE element thus describe changes to the child nodes of the <x> element.

Line 15: is a REMOVE element with a path descriptor "@secondAttr" that points to the attribute 'secondAttr' of the <x> element. Thus, the REMOVE element removes the secondAttr attribute from the <x> element.

Line 16: is an ADD element with a type '2', a name 'newAttr', and a value 'new value', and thus adds a node type of 2, i.e., an attribute node, with name 'newAttr' and value 'new value' to the <x> element.

Line 17: is a CHANGE element with a path descriptor "@firstAttr" that points to the attribute named "firstAttr", and the content shows the new value of such attribute, and thus changes the value of the "firstAttr" attribute of the <x> element to "changed attribute value".

Line 18: is an end element ending the NODE operation. The next operation is once again nested under the <b> element.

Line 19: is a REMOVE element with a path descriptor pointing to the sixth child node of the <b> element, which is the <y> element and all its descendant nodes by default. Thus, the REMOVE operation removes the entire sub-tree under headed by the <y> element. Note that the REMOVE element also has an opid attribute set to "1", and thus is part of an extended operation that will be set forth within the differential document 10 under a DESCRIPTOR element with the same opid attribute.

Line 20: is an ADD element adding under the <b> element an element node (type 1) named "p". The ADD element has a child node which thus describes the child node of the new <p> element.

Line 21: is another ADD element but as a child node of the previous ADD element adds a <q> element as a child of the added <p> element. Here, too, the present ADD element has a child node which describes the child node of the new <q> element.

Line 22: is yet another ADD element but as a child node of the previous ADD element adds a child node of the added <q> element. Here, the ADD element has an absolute path descriptor to the sixth child of the second child of the root node, which is the <y> element, and thus adds the <y> element and all its descendant nodes by default as a child of the <q> element. In addition, the ADD element has an opid attribute of "1". Accordingly, the ADD element and the previous REMOVE element with the same opid attribute form an extended operation, which will be found below under a DESCRIPTOR element with the same opid attribute.

Line 23: is an end element ending the ADD operation that added the <q> element. The next operation is thus nested under the <p> element.

Line 24: is another end element, but ends the ADD operation that added the <p> element. The next operation is thus nested under the <b> element.

Line 25: is yet another end element, here ending the NODE element that pointed to the <b> element. The next operation is thus nested under the root element.

Line 26: is a DESCRIPTOR element describing the extended operation having the opid attribute "1", which as was discussed above includes the ADD element and the p REMOVE element with the same opid attribute. Here, the type attribute reveals that the type of the extended operation is "move", whereby an existing node (the <y> element and its descendants) was removed from one place within the tree of the source version 12 and added at another place within such tree.

Line 27: is an end element ending the differential document 10.

In most every example set forth above, it is seen that the differential document 10 is actually larger than the source and target versions 12, 14, of the document under study. However, it is to be appreciated that in more realistic and larger documents, it is oftentimes the case that the differential document is much smaller than the target version 14, perhaps on the order of 1 to 10 percent, especially if the changes are relatively small compared to the overall size of the document. In such a situation, providing the differential document 10 rather than the target version 14 of the document is clearly more desirable, especially if delivery is effectuated electronically.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful hierarchical differential document 10 representative of changes between versions 12, 14 of a hierarchical document, a differential tool 16 employed to produce the differential document 10, and a differential language employed by the tool 16 to produce the differential document 10. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-implemented method of producing a hierarchical differential document, the differential document reporting changes between a first and a second version of a hierarchical document, the method comprising:

receiving the first and second versions upon an identification of same;

examining the first and second versions and noting the changes therebetween, the changes being definable as a plurality of operations;

identifying at least two of the operations as being related as constituent operations of an extended operation; and constructing the hierarchical differential document to report the changes, including, for each identified extended operation, associating within the differential document each constituent operation of the identified extended operation as being part of such identified extended operation by:

including within the differential document a descriptor identifying the extended operation; and tagging within the differential document each constituent operation of the extended operation and the descriptor of the extended operation with a common ID.

2. The method of claim 1 comprising including within the differential document a descriptor identifying a type for the extended operation.

3. The method of claim 2 comprising including within the differential document a descriptor identifying a type selected from a group consisting of a move, a namespace change, and a prefix change.

4. The method of claim 1 comprising identifying at least two of the operations as being related as constituent operations of an extended operation selected from a group consisting of a move, a namespace change, and a prefix change.

5. The method of claim 1 further comprising displaying the first and second versions of the hierarchical document and in doing so setting off the extended operation by highlighting corresponding portions of the first and second versions of the hierarchical document according to each constituent operation of the extended operation.

6. The method of claim 5 further comprising displaying the first and second versions of the hierarchical document and the hierarchical differential document in doing so setting off the extended operation by highlighting corresponding portions of the first and second versions of the hierarchical document and of the hierarchical differential document according to each constituent operation of the extended operation.

7. The method of claim 1 further comprising allowing a user to reject or accept each change as set forth within the differential document, including, if the user rejects an extended operation, removing all constituent elements of the extended operation.

8. The method of claim 1 further comprising including within the differential document a descriptor identifying the extended operation, and allowing a user to reject or accept each change as set forth within the differential document, including, if the user rejects an extended operation as represented by a descriptor element, employing such descriptor element to remove all constituent elements of the extended operation.

9. A computer-readable storage medium having stored thereon computer-executable instructions for performing a method of producing a hierarchical differential document, the differential document reporting changes between a first and a second version of a hierarchical document, the method comprising:

receiving the first and second versions upon an identification of same;

examining the first and second versions and noting the changes there between, the changes being definable as a plurality of operations;

identifying at least two of the operations as being related as constituent operations of an extended operation; and constructing the hierarchical differential document to report the changes, including, for each identified extended operation, associating within the differential document each constituent operation of the identified extended operation as being part of such identified extended operation by:

including within the differential document a descriptor identifying the extended operation; and tagging within the differential document each constituent operation of the extended operation and the descriptor of the extended operation with a common ID.

10. The medium of claim 9 wherein the method comprises including within the differential document a descriptor identifying a type for the extended operation.

11. The medium of claim 10 wherein the method comprises including within the differential document a descriptor identifying a type selected from a group consisting of a move, a namespace change, and a prefix change.

12. The medium of claim 9 wherein the method comprises identifying at least two of the operations as being related as constituent operations of an extended operation selected from a group consisting of a move, a namespace change, and a prefix change.

13. The medium of claim 9 wherein the method further comprises displaying the first and second versions of the hierarchical document and in doing so setting off the extended operation by highlighting corresponding portions of the first and second versions of the hierarchical document according to each constituent operation of the extended operation.

14. The medium of claim 13 wherein the method further comprises displaying the first and second versions of the hierarchical document and the hierarchical differential document in doing so setting off the extended operation by highlighting corresponding portions of the first and second versions of the hierarchical document and of the hierarchical differential document according to each constituent operation of the extended operation.

15. The medium of claim 9 wherein the method further comprises allowing a user to reject or accept each change as set forth within the differential document, including, if the user rejects an extended operation, removing all constituent elements of the extended operation.

16. The medium of claim 9 wherein the method further comprises including within the differential document a descriptor identifying the extended operation, and allowing a user to reject or accept each change as set forth within the differential document, including, if the user rejects an extended operation as represented by a descriptor element, employing such descriptor element to remove all constituent elements of the extended operation.

17. A computer-implemented differential tool for producing a hierarchical differential document, the differential document reporting changes between a first and a second version of a hierarchical document, the tool comprising:
   a module for receiving the first and second versions upon an identification of same; a module for examining the first and second versions and noting the changes there between, the changes being definable as a plurality of operations;
   a module for identifying at least two of the operations as being related as constituent operations of an extended operation; and
   a module for constructing the hierarchical differential document to report the changes, including, for each identified extended operation, associating within the differential document each constituent operation of the identified extended operation as being part of such identified extended operation by:
      including within the differential document a descriptor identifying the extended operation; and
      tagging within the differential document each constituent operation of the extended operation and the descriptor of the extended operation with a common ID.

18. The tool of claim 17 wherein the module for constructing includes within the differential document a descriptor identifying a type for the extended operation.

19. The tool of claim 18 wherein the module for constructing includes within the differential document a descriptor identifying a type selected from a group consisting of a move, a namespace change, and a prefix change.

20. The tool of claim 17 wherein the module for identifying identifies at least two of the operations as being related as constituent operations of an extended operation selected from a group consisting of a move, a namespace change, and a prefix change.

21. The tool of claim 17 further comprising a module for displaying the first and second versions of the hierarchical document and in doing so setting off the extended operation by highlighting corresponding portions of the first and second versions of the hierarchical document according to each constituent operation of the extended operation.

22. The tool of claim 21 further comprising a module for displaying the first and second versions of the hierarchical document and the hierarchical differential document in doing so setting off the extended operation by highlighting corresponding portions of the first and second versions of the hierarchical document and of the hierarchical differential document according to each constituent operation of the extended operation.

23. The tool of claim 17 further comprising a module for allowing a user to reject or accept each change as set forth within the differential document, including, if the user rejects an extended operation, removing all constituent elements of the extended operation.

24. The tool of claim 17 wherein the module for constructing includes within the differential document a descriptor identifying the extended operation, and further comprising a module for allowing a user to reject or accept each change as set forth within the differential document, including, if the user rejects an extended operation as represented by a descriptor element, employing such descriptor element to remove all constituent elements of the extended operation.

* * * * *